United States Patent Office 2,981,162
Patented Apr. 25, 1961

2,981,162
SOIL STABILIZATION WITH AN ORGANIC DERIVATIVE OF AMMONIA AND AN ACRYLATE POLYMER

Donald T. Davidson, Ames, Iowa, and Robert L. Nicholls, Belvidere, Ill., assignors to Iowa State College Research Foundation, Inc., Ames, Iowa, a corporation of Iowa No Drawing. Filed Apr. 23, 1958, Ser. No. 730,267

7 Claims. (Cl. 94—25)

This invention relates to a method of stabilizing soil.

Soil "stabilization" as distinguished from soil "conditioning" has for its objective the improvements of the engineering properties of natural soils, especially the compressive strengths of the soils when wet. Most soils of the clayey type have relatively high air dry strengths as compared with their wet strengths. Consequently, when it is desired to employ soils as the subbase or base layers for improved highways, as is commonly done in the construction of bituminous roads, it is necessary to treat the soils in some way so as to increase their compressive strengths when wet. Soil conditioning, on the other hand, has as its objective the maintenance and/or improvement of the agricultural properties of soils, and while certain treating agents may tend to improve both the agricultural and engineering properties of soils, there is, generally speaking, a considerable divergence between procedures for soil stabilization and those for soil conditioning.

In prior studies directed particularly to the problem of increasing the wet strengths of soils to facilitate their use as the subbase or base course in the construction of bituminous highways, it has been found that large organic cations are of value as treating agents. The cation-active organic derivatives of ammonia have been most extensively studied in this connection. It has been demonstrated that compounds such as quaternary ammonium salts and amines are useful for this purpose. As prior work has demonstrated, such compounds to be useful for soil stabilization should contain at least one cation-active nitrogen group and at least one long-chain aliphatic group. Some of the prior work is reported in greater detail in the following papers: Davidson, Exploratory Evaluation of Some Organic Cations as Soil Stabilizing Agents, Highway Research Board Proceedings, 29:531–536 (1949); Hoover & Davidson, Organic Cationic Chemicals as Stabilizing Agents for Iowa Loess, Highway Research Board Bulletin, 129:10–25 (1956); and Kardoush, Hoover, & Davidson, Stabilization of Loess with a Promising Quaternary Ammonium Chlorium Chloride, paper presented at the 36th Annual Meeting of the Highway Research Board, Washington, D.C., January 7–11, 1957.

While the use of organic derivatives of ammonia as described above have been found to be of value in soil stabilization, there is still a definite need for obtaining further improvement in the wet strengths of the treated soils. It is therefore a principal object of this invention to provide an improved method which is capable of achieving this result. Further objects and advantages will appear as the specification proceeds.

The method of this invention is applicable generally to soil containing negatively-charged mineral particles, and is particularly useful in the treatment of soils containing at least 1% of clays (hydrated aluminum silicates). Clays in soils are usually in the form of particles finer than 5 microns. According to the present invention, soil which has previously been treated with an organic derivative of ammonia is further treated with a water-soluble acrylate polymer. It has been discovered that the combined use of the organic derivative of ammonia and the acrylate polymer results in a marked improvement in the engineering properties of the soils. More specifically, the compressive wet strengths of the soils can be increased from 50 to 100% over the same soils treated with only the ammonia derivative. Furthermore, this increase in strength cannot be accounted for by the action of the acrylate polymer alone, since when an acrylate polymer alone is applied to soil the compressive wet strength of the soil is not significantly increased. In other words, in the method of the present invention the ammonia derivative and the acrylate polymer cooperate to achieve a result which cannot be achieved by either treating agent separately.

In one preferred embodiment of the present invention, an organic derivative of ammonia providing at least one cation-active nitrogen group and containing at least one aliphatic group having from 8 to 22 carbon atoms is applied in an aqueous carrier to soil containing negatively-charged mineral particles. The ammonia derivative is brought into contact with the mineral particles, by mixing or other suitable dispersing means, and thereby causing the ammonia derivative to adhere to and coat the negatively-charged surfaces of the mineral particles, such as would occur when the soil contains clay particles. There is also applied to the soil, preferably subsequent to the first treating step, a water-soluble acrylate polymer in an aqueous carrier. The acrylate polymer is characterized by providing a plurality of anion-active carboxyl groups and by having an average molecular weight of at least 50,000. This polymer is brought into contact with the coated surfaces of the mineral particles (e.g., by mixing) for cross-linking reaction with the ammonia derivative. After both reagents have been applied to the soil, the treated soil is compacted by rolling or other suitable procedure.

Since the organic cations which may be employed in the present invention are those which would have been known to have value for this purpose on the basis of the prior art, it is not believed that it will be necessary herein to summarize the prior art teachings, as described in the previously cited publications, and in other publications and patents. Quaternary ammonium compounds, amines, ethylene oxide condensation products of amines, and the like may be used, providing they contain at least one cation-active nitrogen group and at least one aliphatic group having from 8 to 22 carbon atoms. The quaternaries and amines may be used in the form of salts, such as their halide salts, acetate salts, etc., or in the hydroxide form. Since practically all of such ammonium derivatives are either soluble or dispersible in water, they can readily be applied in an aqueous carrier. For example, they can be applied in solutions or dispersions in water at concentrations ranging from 1 to 10% on a weight volume basis. The organic cation treating agent will usually be applied to the soil at about .05 to 2 parts by weight of the organic cation per 100 parts of soil. Good results have been achieved with concentrations of the organic cation in the soil of as little as .1 to .2%. No special technique is required in the application. The aqueous dispersion of the ammonia derivative can be sprayed on the soil (which has preferably been previously broken up) and then mixed therewith.

The polyacrylates or acrylic polymers employed in the present invention are the water-soluble low molecular weight "acrylics" which include polyacrylic acid, polymethacrylic acid, and the alkali metal and ammonium salts thereof, and mixtures and/or copolymers of such compounds. Such polyacrylic and polymethacrylic acids, and mixtures and/or copolymers thereof, may thus be defined as a water-soluble alkenecarboxylic acid polymer, the alkenecarboxyl radical of such acid having not more than 4 carbon atoms and not more than 3 of such carbon atoms form a straight chain. According to well known procedures, such polymers can be prepared by the polymerization of acrylonitrile or methacrylonitrile and the subsequent hydrolysis of the polymer to convert the nitrile radicals to carboxylic acid radicals.

The water-soluble acrylate polymers useful in the present invention will usually have an average molecular weight ranging from about 50,000 to 300,000. Such polymers are readily available commercially from a number of sources. For example, the trade designations of several suitable products are: "Acrysol A-1," "Acrysol GS," and "Krilium." Acrysol A-1 is a relatively pure polyacrylic acid produced synthetically from acrylic acid, and is in the form of a 25 weight percent solid aqueous solution. Acrylsol GS is a sodium salt of a polyacrylic acid made by hydrolysis of polyacrylonitrile, and is in the form of a 12% solids aqueous solueion. Krilium is a sodium salt of a polyacrylic acid made by hydrolysis of polyacrylonitrile, and is in the form of a dry, water-soluble powder having a molecular weight greater than 5,000.

If the arcylate polymer is not in the salt form as obtained from the manufacturer (e.g., as sodium polyacrylate) prior to its application to the soil, it is preferably at least partially converted to its salt form by reaction with a suitable hydroxide, such as sodium, potassium or ammonium hydroxide. Thus, acrylate polymers usable in the present invention will be made up essentially of units represented by the structural formula

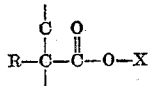

wherein R is either hydrogen or methyl and X is either hydrogen, sodium, potassium or ammonium.

The acrylate polymer will usually be applied in the ratio of from .1 to 5 parts of the polymer per 100 parts of soil. However, it will usually not be necessary to use more than 1 to 2 parts of the polymer per 100 parts of soil, and in many cases excellent results can be achieved at about .5 to .6 part of the polymer per 100 parts of soil. For example, the combination of .2 part of a quaternary ammonium salt and .6 part of an acrylate polymer per 100 parts of soil can produce wet strengths up to 100% greater than can be obtained with the corresponding amount of the quaternary salt alone. Soils treated with the acrylate polymer alone slaked when immersed in water, i.e. they had zero wet strength. The concentration of the acrylate polymer in the treating solution will depend somewhat on the extent of its solubility but will usually be controlled mainly by the amount of water which it is desired to add to the soil. Usually, the concentration will range from 10 to 40% to a volume basis.

It has been further discovered that the engineering property of soils treated in accordance with the method of the present invention can be further improved where the soils are first pretreated with a small amount of a powdered, difficultly water-soluble salt of a transition metal, principally the relatively water-insoluble salts of iron, copper, zinc and nickel. Particularly good results have been obtained with iron salts like ferrous carbonate. Taken generally, salts of transition metals having a solubility in water at 20° C. of over 50 parts of the salt per 100 parts of water are not suitable. Usually, the soil will be broken up and mixed prior to the preparation of the treating agents in the aqueous carriers, and during this preliminary mixing operation it is a simple matter to incorporate the salt of the transition metal in the form of a dry powder. The treating agents in the aqueous carriers can then be applied, and by working rapidly, the soil can be compacted before the salt of the transition metal has dissolved to an extent sufficient to cause the metal ions to react extensively with the acidic groups of the acrylate polymer. After the soil has been compacted, however, this chelation-type reaction is believed to be desirable for the purpose of causing the acrylate polymer chains to assume a kinked configuration and also to increase the water-repellency of the acrylate polymer. Whatever the theory involved, it has been found that the wet strengths of the soil can be further improved if it is first mixed with from .1 to 3 parts of a salt of a transition metal per 100 parts of soil, and usually from .5 to 2 parts of the metal salt will be sufficient.

The present invention is further illustrated by the following examples.

EXAMPLE 1

In this study, a typical clay soil was employed. Technically, the soil may be described as a silty loam C-horizon loess. The large organic cationic material was dihydrogenated tallow dimethylammonium chloride, which is sold under the trade name "Arquad 2 HT." This particular ammonia derivative was selected as being representative of the class which, on the basis of previous work, are capable of promoting the stabilization of soil, and substantially increasing the wet compressive strengths of the coil. As the other treating agent, 9 different polyacids and polyacid salts were used. All of these were water-soluble acrylate polymers providing a plnurality of anion-active carboxyl groups and having average molecular weights of at least 50,000. For example, among the acrylate polymers employed in the test were those sold under the trade names of Acrysol A-1, Krilium, and Acrysol GS, which have been identified in the foregoing specification.

The soil specimens were prepared and tested by the following procedure: The quaternary in a 5% aqueous suspension was added to 700 grams of the soil and mixed in a Hobart Model C-100 mixer. The polyacrylate was added in aqueous solution or aqueous emulsion to the soil, and the mixing was continued, the total water added in both treating steps being enough to bring the soil to optimum moisture content for standard Proctor density. The treated soil was then molded in four 2-inch diameter by 2-inch high specimens compacted to near standard Proctor density. The specimens were then air cured for 7 days and two of each of the four samples were tested in unconfined compression. The remaining two specimens were immersed in water for 24 hours before testing them in unconfined compression.

The results of the foregoing test indicated that the air-dry strengths of most of these specimens were about 1½ times the air-dry strength of the untreated soil. The wet strengths of the samples ranged from 50 to 100% greater than soil treated with corresponding amounts of the quaternary alone. The untreated soil had zero wet strength.

Most of the foregoing tests were carried out by applying .2 part by weight of the quaternary and .6 part of the polyacrylate per 100 parts of soil. It was determined that good results could be obtained at these levels of treatment.

EXAMPLE 2

The tests of Example 1 were repeated, using the quaternary in the form of a hydroxide rather than the chloride. The results obtained corresponded to those described in Example 1. A close comparison of the data indicates that it may be slightly preferabl to employ the quaternary in the form of the hydroxide.

EXAMPLE 3

Further tests were carried out using Compound A from Example 1, (Acrysol A-1), and the quaternary of Example 2 (Arquad 2 HT hydroxide). In the tests ferrous and ferric salts in the low solubility range were premixed with the soil prior to the application of the treating agents in the aqueous carriers. The iron salts employed were ferrous carbonate, ferrous ammonium sulfate, ferrous sulfate, ferrous sulphide, and ferric sulfate. Each salt was tested at concentrations in the soil of .5% and 2.5%. The quaternary was applied to obtain a concentration in the soil of 0.2%, and the acrylate to obtain a concentration of 0.6%. The same curing and testing procedure was used as in Example 1.

The results of the test indicated that the premixing of the dry iron salt with the soil prior to the treatment resulted in significantly higher wet strengths than when only the quaternary and acrylate were used. Of the salts tested, ferrous carbonate gave the best result.

EXAMPLE 4

Further tests were run employing a number of different organic derivatives of ammonia. Since compound A and ferrous carbonate have been found to give optimum results on the basis of previous tests, these compounds were combined with each of the different ammonia derivatives in the manner previously described.

The ferrous carbonate was employed at a concentration in the soil of 1.6%, the large organic cations at a concentration of 0.1%, and the polyacrylate at a concentration of 0.6%. The ammonia derivatives are further identified below in Table A:

Table A

| Compound | Description | Tradename |
|----------|-------------|-----------|
| 1 | Tallow amine acetate | Armac T. |
| 2 | Di-hydrogenated tallow dimethyl ammonium chloride. | Arquad 2HT. |
| 3 | Ethylene oxide condensation product of tallow amine. | Ethomene T/13. |
| 4 | Trimethyl dodecyl ammonium chloride. | Arquad 12. |
| 5 | Condensation product of ethylene oxide and dehydroabietylamine. | Polyrad 1100. |

Definitely positive results were obtained with all of the samples, that is, the wet compressive strengths were significantly increased. Best results were obtained with compounds 1 and 2. The experiment established that the method of this invention is applicable as a means of improving the wet strengths which can be obtained by the treating of soil with a wide variety of different cation-active organic derivatives of ammonia.

While in the foregoing specification the present invention has been described with reference to specific embodiments thereof and many details have been set forth for purpose of illustration, it will be apparent to those skilled in the art that the invention is susceptible to other embodiments and that many of the details described herein can be varied considerably without departing from the basic principles of the invention.

We claim:

1. The method of stabilizing soil containing negatively-charged mineral particles, comprising applying to said soil in an aqueous carrier an organic derivative of ammonia having soil stabilization properties, said ammonia derivative providing at least one cation-active nitrogen group and containing at least one aliphatic group having from at least 8 to about 18 carbon atoms, said ammonia derivative being brought into contact with said mineral particles to coat the surfaces thereof and being applied in the proportions of from about .05 to 2 parts of said ammonia derivative per 100 parts of soil being coated, also applying to said coil in an aqueous carrier a water-soluble acrylate polymer providing a plurality of anion-active carboxyl groups and having an average molecular weight of at least 50,000, said polymer being brought into contact with the coated surfaces of said mineral particles for cross-linking reaction with the said ammonia derivative and being applied in the proportions of from about .1 to 5 parts of said polymer per 100 parts of soil which has been coated with said ammonia derivative, and thereafter compacting said soil.

2. The method of claim 1 in which said ammonia derivative is a quaternary ammonium compound.

3. The method of claim 1 in which said acrylate polymer prior to its application to said soil had been at least partially converted to its salt form by reaction with a base selected from the group consisting of sodium, potassium, and ammonium hydroxide.

4. The method of stabilizing soils containing clays, comprising applying to said soils in an aqueous carrier a quaternary ammonium salt having soil stabilization properties, said quaternary ammonium salt containing at least one aliphatic group having from at least 8 to about 18 carbon atoms, said quaternary being brought into contact with the clay particles in said soil to coat the surfaces thereof and being applied in the proportions of from about .05 to 2 parts of said quaternary per 100 parts of soil being coated, also applying to said soil in an aqueous carrier a water-soluble acrylate polymer having an average molecular weight within the range from about 50,000 to 300,000, said polymer being made up essentially of units represented by the structural formula

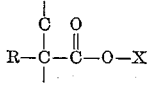

wherein R represents a member selected from the group consisting of hydrogen and methyl and X represents a member selected from the group consisting of hydrogen, sodium, potassium, and ammonium, said polymer being brought into contact with the coated surfaces of said mineral particles for cross-linking reaction with the said quaternary and being applied in the proportions of from about .1 to 5 parts of said polymer per 100 parts of soil which has been coated with said quaternary, and thereafter compacting said soil.

5. The method of claim 4 in which said acrylate polymer prior to its application to said soil has been at least partially converted to its salt form by reaction with a base selected from the group consisting of sodium, potassium, and ammonium hydroxide.

6. The method of stabilizing soils containing clays, comprising first mixing the soil to be stabilized with a powdered, difficultly-water-soluble iron salt in proportions of about .1 to 3 parts of said salt per 100 parts of the soil to be stabilized, next applying to said soil in an aqueous carrier an organic derivative of ammonia and being applied in the proportions of from about .05 to 2 parts of said ammonia derivative to 100 parts of soil being coated providing at least one cation-active nitrogen group containing at least one aliphatic group having from at least 8 to about 18 carbon atoms, said ammonia derivative being brought into contact with the clay particles in said soil to coat the surfaces thereof, also applying to said soil in an aqueous carrier a water-soluble acrylate polymer providing a plurality of anion-active carboxyl groups and having an average molecular weight of at least 50,000, said acrylate polymer prior to its application to said soil having been at least partially converted to its salt form by reaction with a base selected from the group consisting of sodium, potassium, and ammonium hydroxide, said polymer being brought into contact with the coated surfaces of said clay particles for cross-linking reaction with the said ammonia derivative and being applied in the proportions of from about .1 to 5 parts of said polymer per 100 parts of soil which has been coated with said ammonia derivative, and thereafter compacting said soil.

7. The method of claim 6 in which said salt is ferrous carbonate.

References Cited in the file of this patent

Grossi et al.: Ind. & Eng. Chem., volume 47, No. 11, November, 1955, pages 2253–2258.